(12) United States Patent
Spirito et al.

(10) Patent No.: US 7,171,796 B2
(45) Date of Patent: Feb. 6, 2007

(54) METHOD OF FORMING GROUPS OF CIGARETTES ON A PACKING MACHINE

(75) Inventors: Gilberto Spirito, Bologna (IT); Alessando Minarelli, Bazzano (IT)

(73) Assignee: G.D Societa' per Azioni, Bologna (IT)

( * ) Notice: Subject to any disclaimer, the term of this patent is extended or adjusted under 35 U.S.C. 154(b) by 54 days.

(21) Appl. No.: 11/083,045

(22) Filed: Mar. 17, 2005

(65) Prior Publication Data
US 2005/0204706 A1 Sep. 22, 2005

(30) Foreign Application Priority Data
Mar. 22, 2004 (IT) .......................... BO2004A0166

(51) Int. Cl.
*B65B 19/32* (2006.01)
(52) U.S. Cl. .............................. 53/444; 53/54; 53/151
(58) Field of Classification Search ................. 53/444, 53/53, 54, 149–151; 198/577; 209/535
See application file for complete search history.

(56) References Cited

U.S. PATENT DOCUMENTS

| | | | | |
|---|---|---|---|---|
| 3,426,503 A | * | 2/1969 | Sherrill | 53/151 |
| 3,735,767 A | * | 5/1973 | Kruse et al. | 53/148 |
| 3,771,279 A | * | 11/1973 | Seragnoli | 53/151 |
| 4,134,502 A | * | 1/1979 | Seragnoli | 53/54 |
| 4,209,955 A | | 7/1980 | Seragnoli | |
| 4,528,801 A | | 7/1985 | Seragnoli et al. | |
| 5,170,877 A | * | 12/1992 | Francioni | 198/577 |
| 5,524,414 A | * | 6/1996 | Spada et al. | 53/54 |
| 6,047,526 A | * | 4/2000 | Draghetti | 53/443 |
| 6,484,867 B2 | * | 11/2002 | Spatafora et al. | 53/444 |

FOREIGN PATENT DOCUMENTS

| | | |
|---|---|---|
| EP | 1 020 357 | 7/2000 |
| GB | 1 298 785 | 12/1972 |

* cited by examiner

*Primary Examiner*—Stephen F. Gerrity
(74) *Attorney, Agent, or Firm*—Ladas & Parry

(57) ABSTRACT

A method of forming groups of cigarettes on a packing machine, whereby a conveyor feeds a succession of pockets in steps past a number of group-forming stations, where the pockets receive respective groups of cigarettes fed axially to the relative pockets by means of independent pushers, which are operated in a normal cyclic operating sequence to move selectively through respective group-forming stations; and whereby the formation of a gap along the conveyor, caused by non-supply of a faulty group to a relative pocket, is prevented by replacing the normal cyclic operating sequence with a different cyclic sequence capable of ensuring all the pockets are filled as of the fully operative group-forming stations only.

9 Claims, 3 Drawing Sheets

METHOD OF FORMING GROUPS OF CIGARETTES ON A PACKING MACHINE

The present invention relates to a method of forming groups of cigarettes on a packing machine.

More specifically, the present invention relates to a method of forming groups of cigarettes on a packing machine of the type comprising a conveyor moving in a constant sequence of steps along a loading path, and having a number of pockets spaced along the conveyor with a spacing equal to one of said steps, each pocket receiving a respective group of cigarettes; a hopper having n outlets, each for feeding a succession of groups of cigarettes to a respective group-forming station located along the loading path and receiving one respective group at a time, the stations being divided into k first groups (where k varies from one to n) spaced apart by a distance equal to at least two said steps, and the stations in each first group being spaced along the loading path with a spacing equal to one of said steps; and n independent pushers divided into k second groups, each pusher being movable through a respective station to transfer a respective group of cigarettes to a respective pocket.

BACKGROUND OF THE INVENTION

In packing machines of the type described above, the conveyor pockets are filled, as they travel along the loading path, by operating the pushers in a succession of cycles. At each cycle, all the pushers are operated once in an operating sequence in which the time lapse between operation of two consecutive pushers equals the time taken for the conveyor to advance a number of steps, which may even be zero, and which depends on the pair of pushers considered and may vary from one pair to another.

Though widely used for forming groups of cigarettes on packing machines, the above method has several drawbacks, mainly due to any faulty groups, i.e. incomplete groups or groups containing one or more faulty cigarettes, being rejected from the respective pockets downstream from the group-forming station.

As a result of the vacancy produced along the conveyor by rejection of a faulty group, the packing materials relative to the missing group must also be rejected, thus possibly resulting in jamming of the packing machine. To eliminate this drawback, complex, high-cost control systems have been proposed to detect a vacancy travelling along the packing machine, and to prevent supply of the relative packing materials accordingly.

SUMMARY OF THE INVENTION

It is an object of the present invention to provide a method of forming groups of cigarettes, which can be employed on a packing machine of the type described above, and which prevents the formation of vacancies along the conveyor and packing machine.

According to the present invention, there is provided, on a packing machine of the type described above, a method of forming groups of cigarettes, as claimed in the attached claims.

BRIEF DESCRIPTION OF THE DRAWINGS

A non-limiting embodiment of the present invention will be described by way of example with reference to the accompanying drawings, in which.

DETAILED DESCRIPTION OF THE INVENTION

Figure 1:
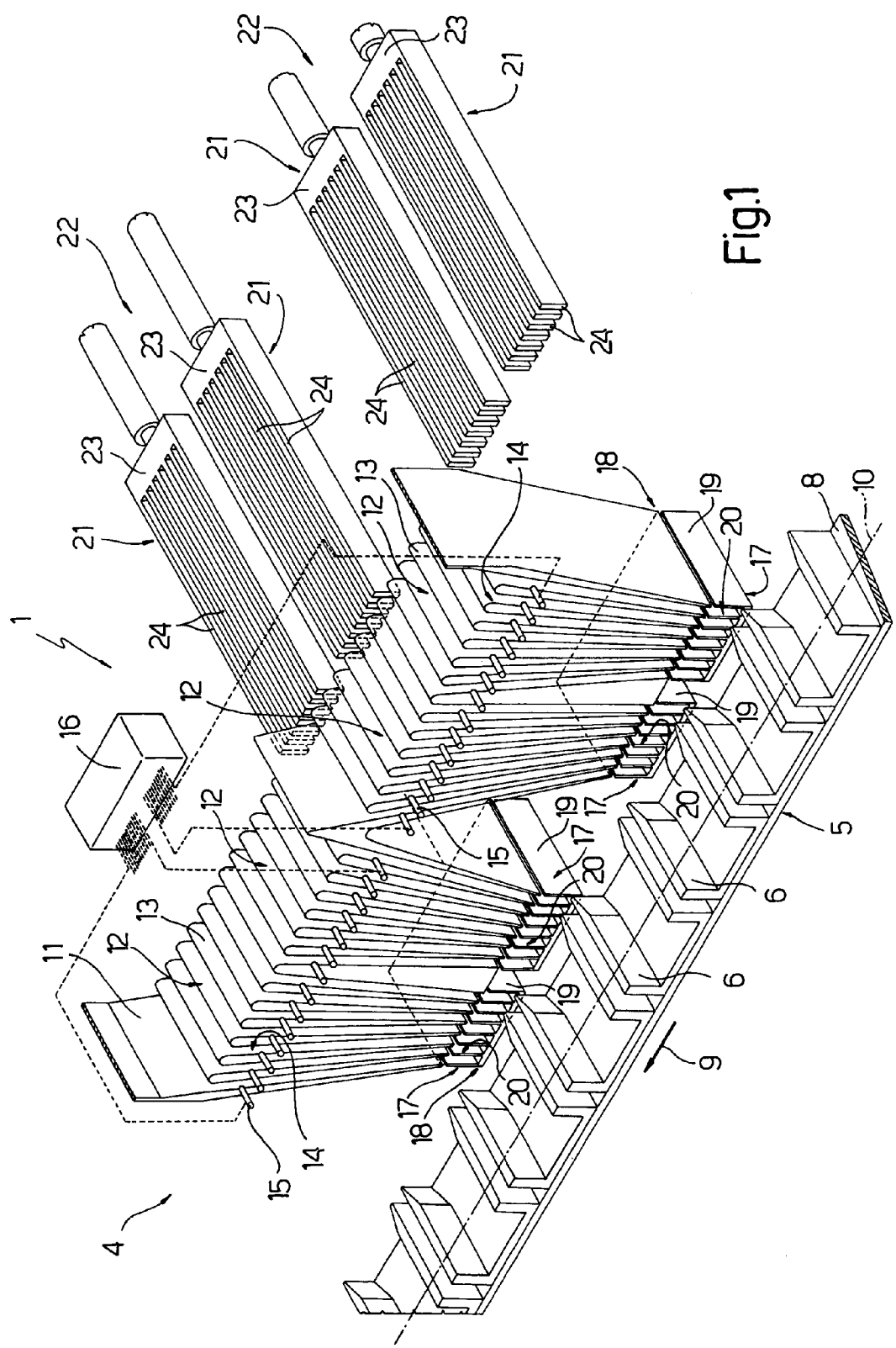
FIG. 1 shows a view in perspective, with parts removed for clarity, of a unit for forming groups of cigarettes and implementing the method according to the present invention.

Number 1 in FIG. 1 indicates as a whole a unit for forming groups 2 (FIG. 2) of cigarettes 3. Unit 1 defines the input portion of a cigarette packing machine 4, and comprises a belt conveyor 5 having a number of pockets 6 spaced with a spacing 7 along the periphery of conveyor 5, and each for housing a respective group 2. Conveyor 5 comprises a conveying branch 8 travelling, in a constant sequence S1 of steps, each equal to spacing 7 and hereinafter referred to as step 7, in a substantially horizontal direction 9 and along a loading path 10, along which groups 2 are loaded into respective pockets 6, to feed groups 2 to a packing line (not shown) of packing machine 4.

Figure 2:
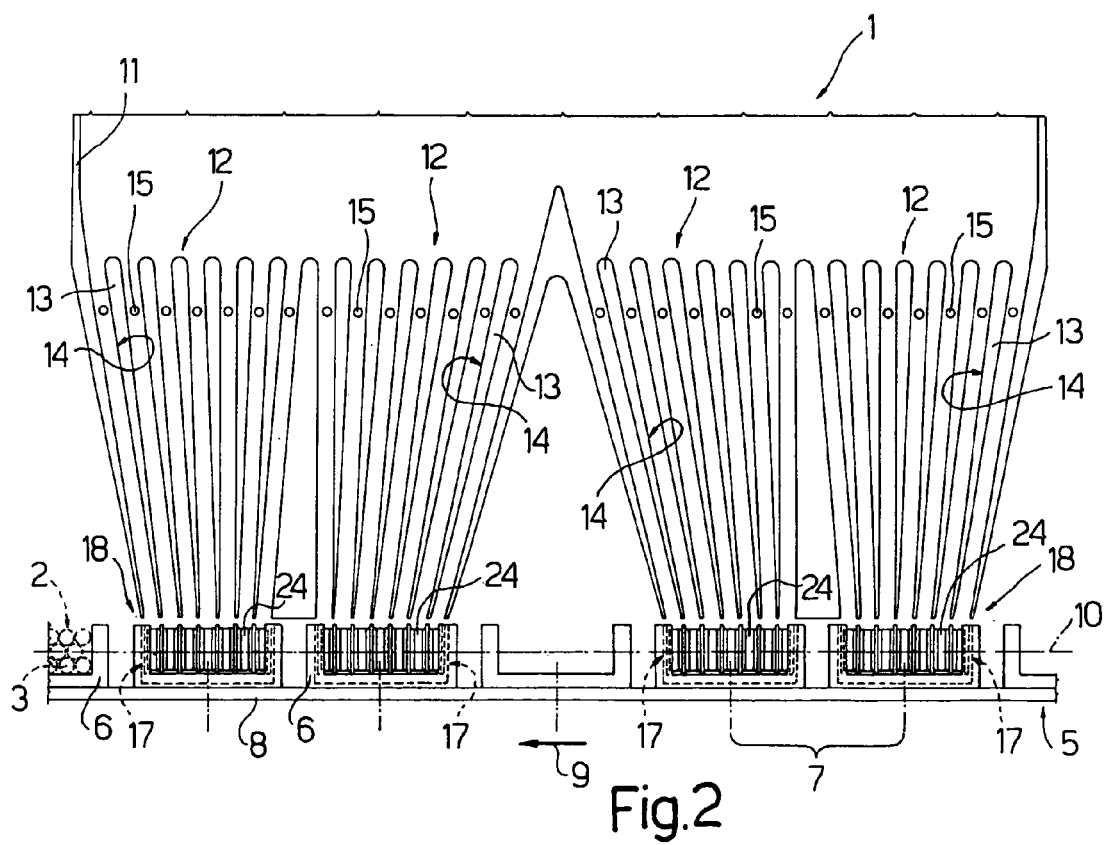
FIG. 2 shows a larger-scale front view of the FIG. 1 unit.

As shown in FIGS. 1 and 2, unit 1 also comprises a hopper 11, a bottom end portion of which is defined by four downward-tapering outlets 12, each divided by a number of substantially vertical partitions 13 into a number of channels 14, each for receiving a respective column of cigarettes 3 moving by force of gravity crosswise to their longitudinal axes. Each channel 14 is fitted, at a top inlet portion, with a sensor 15 connected to a central control unit 16 and for detecting hollow or missing cigarettes inside channel 14.

Outlets 12 come out inside respective group-forming stations 17 arranged in two groups 18 spaced apart by a distance equal to twice spacing 7, while stations 17 in each group 18 are spaced apart with a spacing equal to spacing 7.

As shown more clearly in FIG. 1, each group-forming station 17 comprises a substantially parallelepiped-shaped box 19 positioned with one end facing conveying branch 8, and divided longitudinally into a number of compartments 20, each of which is aligned with the outlet of a corresponding channel 14, and has a respective longitudinal axis crosswise to travelling direction 9.

Each box 19 catches cigarettes 3 falling down relative channels 14 to form a respective group 2 inside compartments 20.

As shown in FIG. 1, unit 1 also comprises four independent pushers 21 divided equally into two groups 22 and each aligned with a respective station 17. Each pusher 21 comprises a comb 23, which is defined by a number of teeth 24, each aligned with a respective compartment 20 of relative box 19, and is movable, by a respective known linear actuator (not shown) and in a direction crosswise to travelling direction 9, between a withdrawn rest position, in which comb 23 is located outside respective station 17 and on the opposite side of station 17 to conveying branch 8, and a forward work position, in which comb 23 extends through respective station 17 to feed cigarettes 3 in relative box 19 to a respective pocket 6 arrested in front of station 17.

Operation of unit 1 will now be described relative to a normal operating condition, in which all four outlets 12 are operating normally.

In the normal operating condition, to feed respective groups 2 into all the pockets 6 travelling along loading path 10 and past stations 17 in a constant sequence S1 of steps 7, pushers 21 are selectively operated reciprocatingly, as of the withdrawn position, in a succession of cycles, in each of which, pushers 21 are all operated once in an operating sequence S2, in which the time lapse between operation of two consecutive pushers 21 equals the time taken for pockets 6 to advance a number of steps 7, which may even be zero, and which depends on the pair of pushers 21 considered and may vary from one pair to another.

Figure 3:
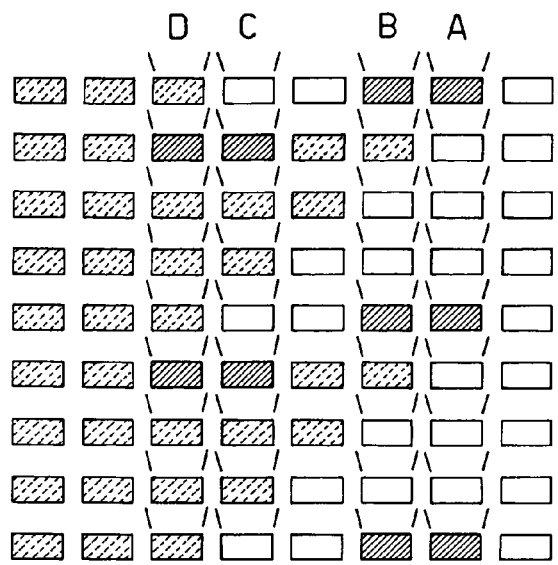
FIG. 3 shows a cigarette group forming sequence on the FIG. 1 unit in a normal operating condition.

By way of example, sequence S2 of a particular operating cycle of pushers 21 will be described with reference to FIG. 3. In FIG. 3, each two rows of rectangles represent the change in the position of pockets 6 following a step 7 of conveyor 5; pushers 21 are indicated A, B, C, D, as of the first pusher 21 on the right in FIG. 1; the hatched rectangles indicate the full pockets 6; and the bold rectangles indicate the pockets 6 filled at the end of step 7 considered.

As shown in FIG. 3, at the start of a cycle, four consecutive empty pockets 6 are positioned along the portion of loading path 10 extending between pushers A and C. During the stop of conveyor 5 (top row), pushers A and B are operated simultaneously to feed respective groups 2 into respective pockets 6. Once the respective groups 2 are transferred, pushers A and B withdraw into the withdrawn rest position, thus disengaging respective boxes 19 to allow further cigarettes 3 to drop down into respective compartments 20 to form another respective group 2.

Following the next step 7 (second row from the top in FIG. 3), the two empty pockets 6 downstream from pushers A and B are arrested at pushers C and D to receive respective groups 2 by simultaneously operating pushers C and D. The next three steps 7, during which pushers A, B, C, D are not operated, conclude the cycle, and move the full pockets 6 downstream from pusher C (fifth row from the top in FIG. 3) to return to the start configuration.

The succession of cycles of respective operating sequences S2 may therefore be represented schematically as follows:

[AB-CD - - - ] [AB-CD - - - ] [AB-CD - - - ] [     1)

where each dash "-" indicates a step 7, and each dash between two square brackets is a sequence S2.

It should be pointed out that the same result would be obtained performing a succession of cycles of different sequences S2, such as:

[A-C-B-D-] [A-C-B-D-] [A-C-B-D-] [     2)

or

[AC - - - BD-] [AC - - - BD-] [AC - - - BD-] [     3)

During operation of packing machine 4, a sensor 15 may detect, along relative channel 14, a faulty cigarette and/or a gap caused, for example, by clogging of the inlet of channel 14 or by an improperly positioned cigarette 3 inside channel 14. Either of the above events results in the formation, at relative station 17, of a faulty group; in which case, central control unit 16 prevents the faulty group from being fed to relative pocket 6 by somehow disabling relative station 17, and replaces sequence S2 with a sequence S3, which depends on the location, along loading path 10, of the disabled station 17, and ensures all the pockets 6 are filled as of the fully operational stations 17 only.

In connection with the above, it should be pointed out that there are various ways of disabling a station 17, and the method selected by central control unit 16 normally depends on the type of event detected. For example, if a faulty cigarette is detected inside a channel 14, the relative faulty group is normally formed at relative station 17 and then rejected, in known manner not shown, as it is being expelled from station 17 and before it reaches relative pocket 6. Alternatively, if a gap is detected along a channel 14, pusher 21 moving through the relative station 17 is locked inside station 17, once the last complete group 2 is expelled, thus closing off relative outlet 12, which is only reactivated following intervention by the operator and when it is again able to form complete groups 2.

Sequence S3 is continued for as long as a station 17 remains inactive.

Figure 5:
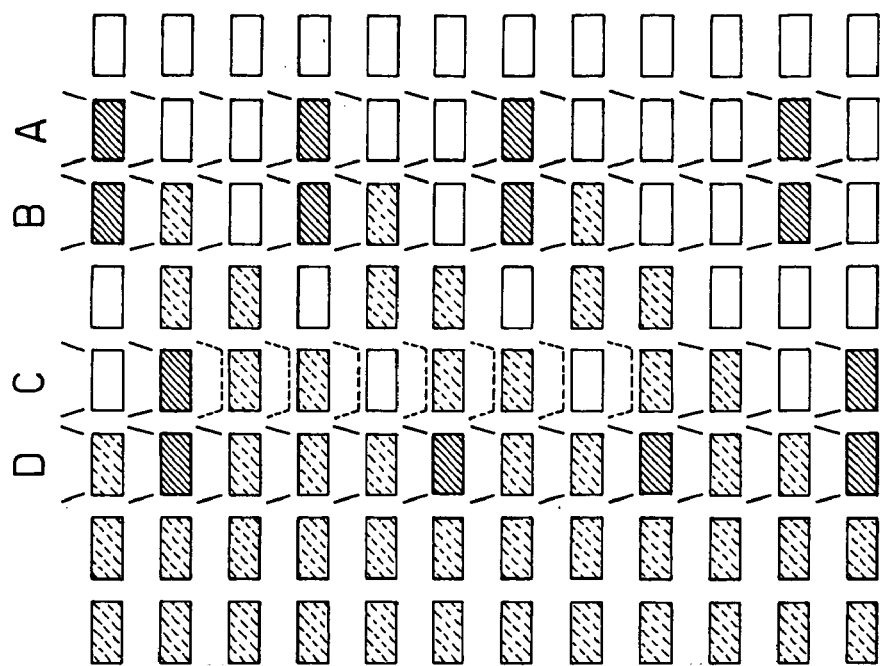
FIGS. 4 and 5 are similar to FIG. 3, and show respective cigarette group forming sequences on the FIG. 1 unit in respective further operating conditions.
Figure 4:
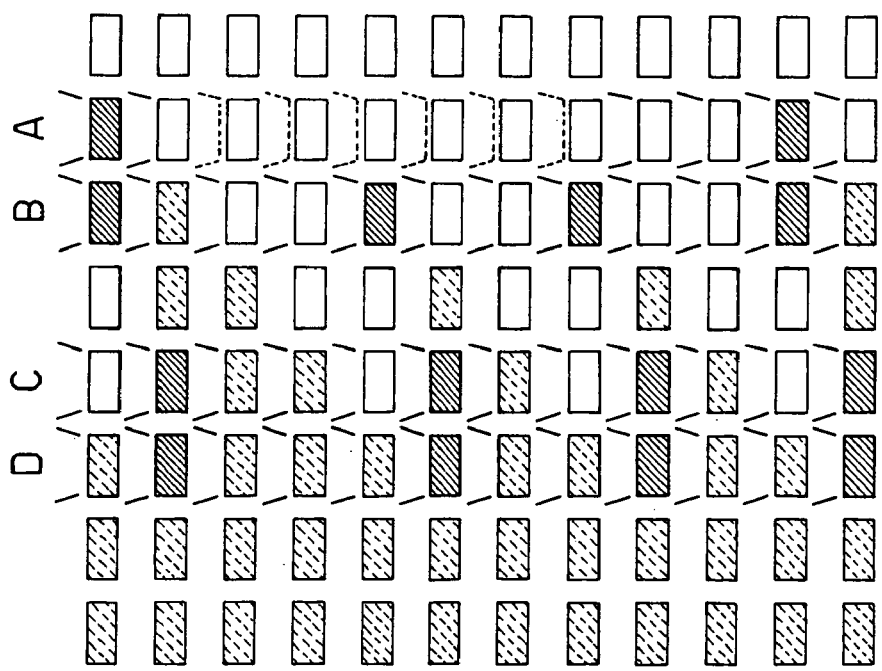

FIGS. 4 and 5 show respective successions of S2 and S3 sequence cycles, in the event stations 17 associated with pusher A (FIG. 4) and pusher C (FIG. 5) are disabled. The same symbols are used in FIGS. 4 and 5 as in FIG. 3, with the addition of a dash line above each rectangle indicating a pocket 6 arrested in front of a disabled station 17.

In the first case, a cycle S3 may be illustrated schematically as follows:

[B-CD - - ]     4)

and in the second case:

[AB - - D-]     5)

In connection with the above, it should be pointed out that, though the above takes into consideration only one disabled station 17, sequences S3 may also be used to ensure all the pockets 6 of conveyor 5 are filled in the event of two simultaneously disabled stations 17. In this case, however, the output speed of packing machine 4 would most likely drop to such an extent as to make stoppage of packing machine 4 and a return to normal operating conditions inevitable.

The method according to the present invention does not only apply to unit 1, but also to units similar to unit 1 and comprising a different number of stations 17, i.e. units in which stations 17 are other than four in number and divided into other than two groups 18.

In fact, for any n number of stations 17 of two or more, and for any k number of groups 18 of one or more, sequences S2 ensuring all the conveyor pockets 6 are filled can always be found; and, similarly, sequences S3 can always be found to ensure the same result in the event of simultaneous disabling of a number of stations 17 ranging from one to n–1.

The invention claimed is:

1. A method of forming groups (2) of cigarettes (3) on a packing machine (4), the method comprising the stages of
feeding a succession of pockets (6), in a first constant sequence (S1) of travelling steps (7), past a number of group-forming stations (17); and
feeding the groups (2) at the relative group-forming stations (17) axially into respective pockets (6) by means of independent pushers (21), which are operated in a second cyclic operating sequence (S2) to move selectively through the respective group-forming stations (17) to fill all the pockets (6) as the pockets (6) are fed past the group-forming stations (17);
the method being characterized by comprising the further stages of preventing supply of a faulty group to a relative pocket (6) by disabling the relative group-forming station (17); and
preventing formation of a gap, caused by non-supply of the faulty group, by replacing the second cyclic operating sequence (S2) with a third cyclic sequence (S3)

ensuring all the pockets (6) are filled as of the fully operative group-forming stations (17) only.

2. A method as claimed in claim 1, wherein a group-forming station (17) is disabled by locking the group-forming station (17) prior to receiving said faulty group.

3. A method as claimed in claim 2, wherein the group-forming station (17) is locked by locking the relative pusher (21) inside the group-forming station (17).

4. A method as claimed in claim 1, wherein a group-forming station (17) is disabled by rejecting the relative group (2) upstream from the relative pocket (6).

5. A method of forming groups (2) of cigarettes (3) on a packing machine (4) for packing cigarettes (3), the packing machine having

- a conveyor (5) travelling in a first constant sequence (S1) of travelling steps (7) along a loading path (10), and having a number of pockets (6) spaced along the conveyor (5) with a spacing equal to one of said travelling steps (7), each pocket (6) receiving a respective group (2) of cigarettes (3);
- a hopper (11) having n outlets (12), each for feeding a succession of groups (2) of cigarettes (3) to a respective group-forming station (17) located along the loading path (10) and for receiving one respective group (2) at a time, the stations (17) being divided into k first groups (18) spaced apart by a distance equal to at least two said travelling steps (7), and the stations (17) in each first group (18) being spaced along the loading path (10) with a spacing equal to one of said travelling steps (7); and
- n independent pushers (21) divided into k second groups (22), each pusher (21) being movable through a respective station (17) to transfer a respective group (2) of cigarettes (3) to a respective pocket (6);

the method of forming groups (2) of cigarettes (3) comprising the stages of filling said pockets (6), as they are fed along the loading path (10), by operating the pushers (21) in a succession of cycles, during each of which the pushers (21) are operated in a second operating sequence (S2), in which the time lapse between operation of each pusher (21) and the next consecutive pusher (21) equals the time taken to perform a number of said travelling steps (7);

controlling said outlets (12) to predict supply of a faulty group to the relative station (17);

preventing supply of the faulty group to the relative pocket (6) by disabling the relative group-forming station (17); and preventing formation of a gap, caused by non-supply of the faulty group, by replacing the second cyclic operating sequence (S2) with a third cyclic sequence (S3) ensuring all the pockets (6) are filled as of the fully operative group-forming stations (17) only.

6. A method as claimed in claim 5, wherein the pushers (21) in each second group (22) are only operated once per cycle.

7. A method as claimed in claim 5, wherein, at each cycle, the time lapse between operation of each pusher (21) and the next consecutive pusher (21) equals the time taken to perform a number, other than zero, of said travelling steps (7).

8. A method as claimed in claim 5, wherein, at each cycle, the time lapse between operation of each pusher (21) and the next consecutive pusher (21) equals the time taken to perform zero said travelling steps (7).

9. A method as claimed in claim 5, wherein the third sequence (S3) is a function of the location, along the loading path (10), of the station (17) forming the faulty group.

* * * * *